UNITED STATES PATENT OFFICE.

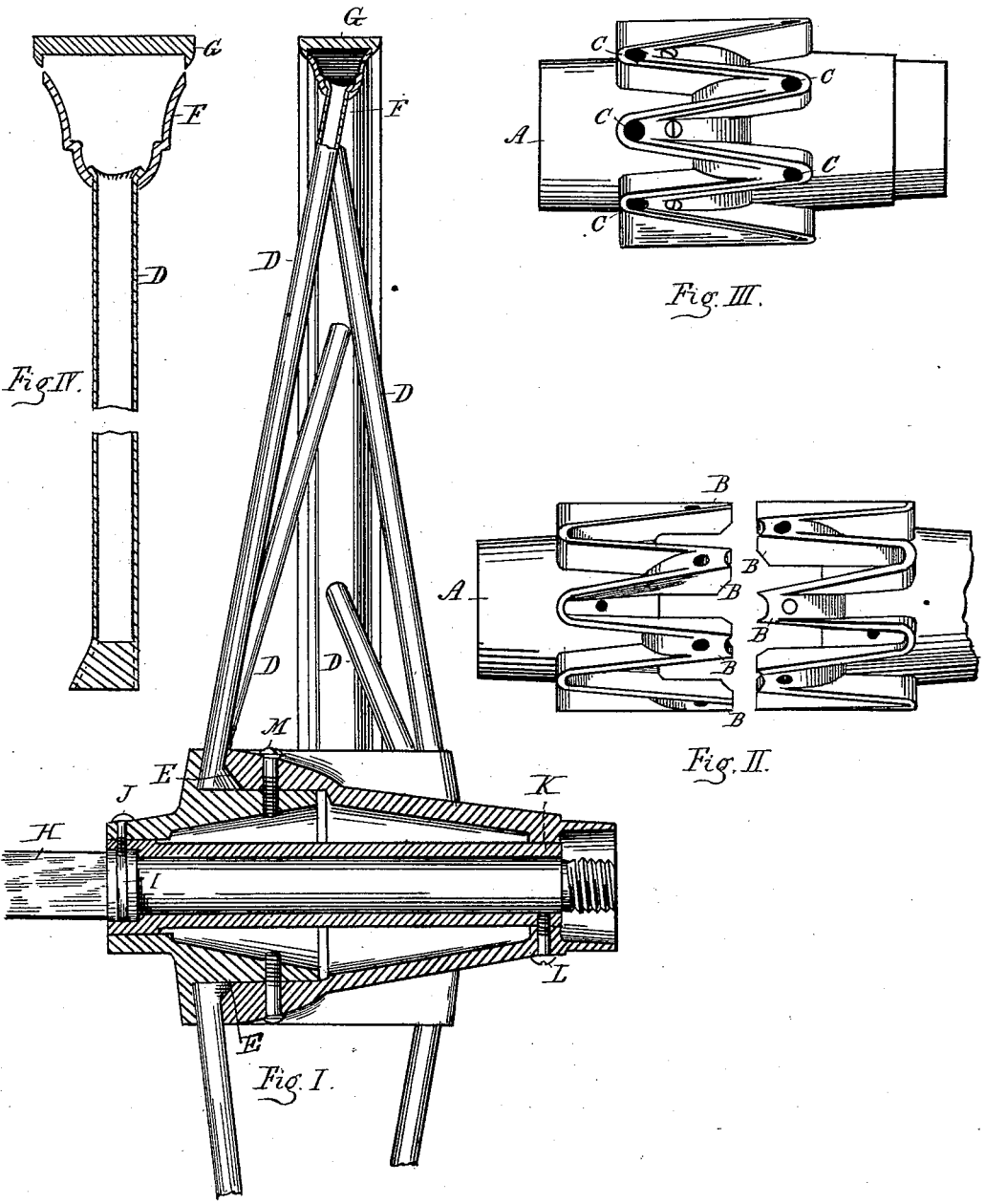

JULIUS SEVERIN, OF AURORA, INDIANA.

VEHICLE-WHEEL.

SPECIFICATION forming part of Letters Patent No. 453,215, dated June 2, 1891.

Application filed July 15, 1890. Serial No. 358,810. (No model.)

*To all whom it may concern:*

Be it known that I, JULIUS SEVERIN, of Aurora, in the county of Dearborn and State of Indiana, have invented a new and useful Improvement in Vehicle-Wheels, which improvement is fully set forth in the following specification and accompanying drawings, in which—

Figure I is a sectional view of my improved vehicle-wheel; Fig. II, a view of the hub, the sections being detached, showing the alternating projecting fingers in detail and the alternating recesses which receive the fingers; Fig. III, a view of the hub, showing the sections interlocked; Fig. IV, a detail view of one of the spokes and a cross-section of the felly and the flanged tire.

My invention relates to special improvements in vehicle-wheels; and its object is to provide a simple, novel, and practical device whereby wheels may be constructed of the most suitable materials and in such a manner that they shall combine lightness with strength, durability, and attractive appearance.

The essential features of the invention consist in the peculiar construction and combination of the several parts and their adaptation to each other, as will be described in the following specification and accompanying drawings, in which—

A designates the hub, which is preferably made of malleable iron and cast in two sections, having alternating horizontal projections or fingers B, which interlock when the sections are brought together. The outer ends of the projections are rounded out and, with the curves at the ends of the outer part which comes opposite, thereby form appropriate openings C for the spokes D, which are made of iron pipe of suitable size, having enlargements at their inner ends which engage corresponding recesses E under the projecting fingers. The said enlargements are readily made by welding a short section of half-round iron on the ends of the spokes and swaging them by a tool of the required form. The felly or rim F is made of angle-iron, which is rolled in ornamental form, as shown in the drawings. This form commends itself, being a desirable combination of symmetry, lightness, and strength. The felly is clasped by the depending flanges of the tire G. Its edges are thus protected from defacement, the tire cannot become detached therefrom, and no bolts are required to fasten each to the other. Suitable apertures are bored in the felly to receive the outer ends of the spokes, which are rigidly attached thereto by the electric-welding process. The spindle H has near its shoulder a groove I, which engages a set-screw J. By this means the wheel is retained upon the axle independently of the axle-nut. The importance of this feature of my device will be apparent in view of the disastrous results which so frequently ensue when a nut is misplaced or works off when the vehicle is running. The skein or box K is forced into the hub by a suitable press and is made secure by screw L. The sections of the hub are also united by screws M, which connect the alternate projecting fingers with the inner shell or body of the adjoining section.

What I claim as new is—

1. In a metallic vehicle-wheel, a hub composed of two sections having tapering projections or fingers rounded out at the ends and alternating with corresponding interlocking notches formed to embrace the spokes and provided underneath the fingers with recesses which engage the enlarged inner ends of the spokes, substantially as herein set forth.

2. In a metal wheel, as set forth, the hub made in two sections, each having tapering fingers rounded out at the ends and alternating interlocking notches and recesses, combined with the spokes and felly, as described, the two parts of the hub secured together by screws M and upon the skein by the screws L, and engaging on the axle grooved at I by set-screws J.

In testimony that I claim the foregoing I have hereunto set my hand, this 3d day of July, 1890, in the presence of two witnesses.

JULIUS SEVERIN.

Witnesses:
CHARLES B. MCHENRY,
JOHN L. KARSEBAUM.